Nov. 3, 1953  A. DERBYSHIRE ET AL  2,657,646
APPLICATION OF PLASTIC SUBSTANCES
TO BISCUITS AND THE LIKE ARTICLES
Filed April 19, 1951  4 Sheets-Sheet 3
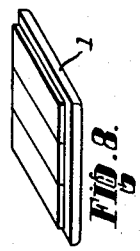
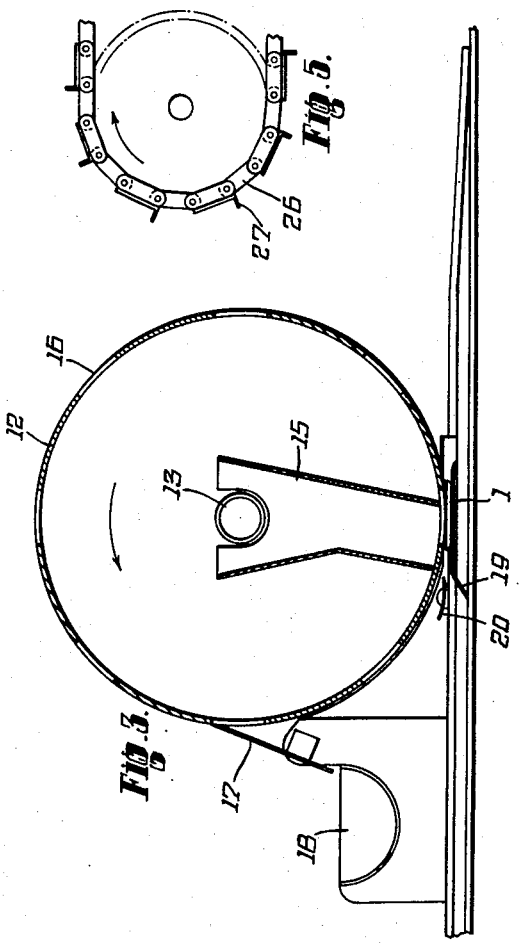
INVENTORS
ALFRED DERBYSHIRE AND
JOSEPH FRANCIS NAYLOR
BY
Jewett, Mead, Browne & Schuyler
ATTORNEYS Nov. 3, 1953    A. DERBYSHIRE ET AL    2,657,646
APPLICATION OF PLASTIC SUBSTANCES
TO BISCUITS AND THE LIKE ARTICLES
Filed April 19, 1951    4 Sheets-Sheet 4
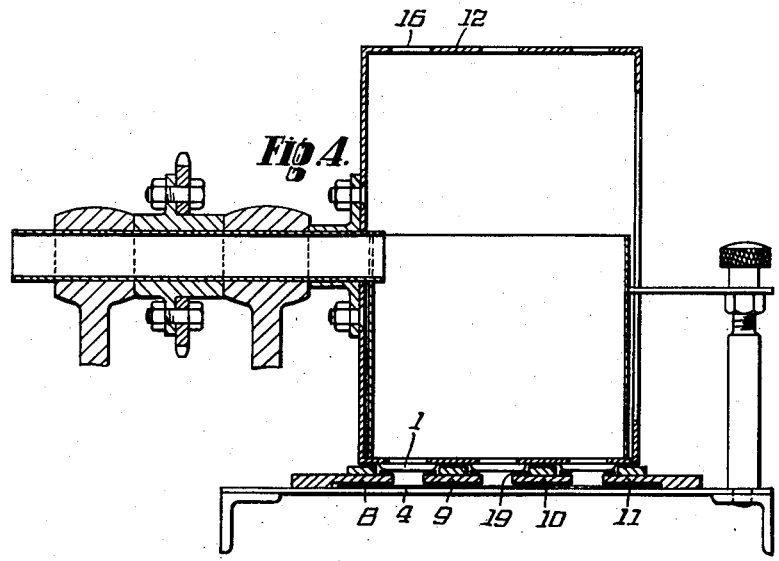
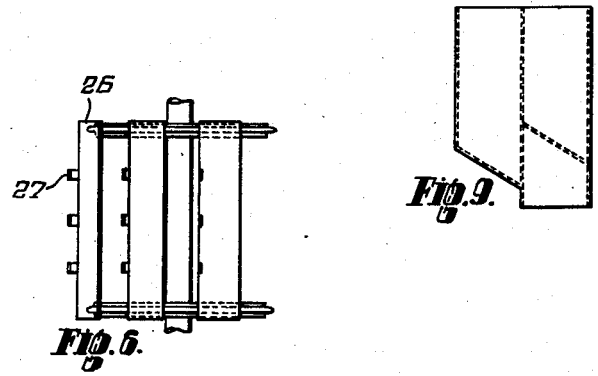
INVENTORS
ALFRED DERBYSHIRE AND
JOSEPH FRANCIS NAYLOR
BY
Jewett, Mead, Browne & Schuyler
ATTORNEYS Patented Nov. 3, 1953

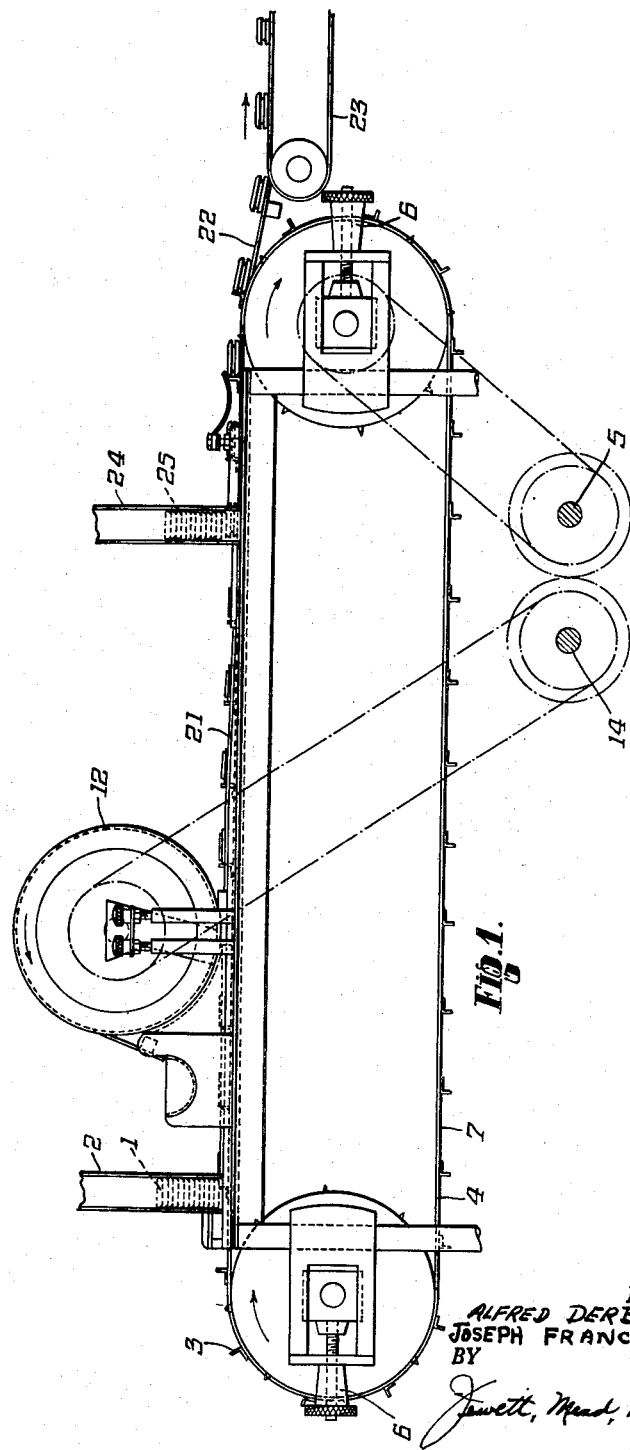

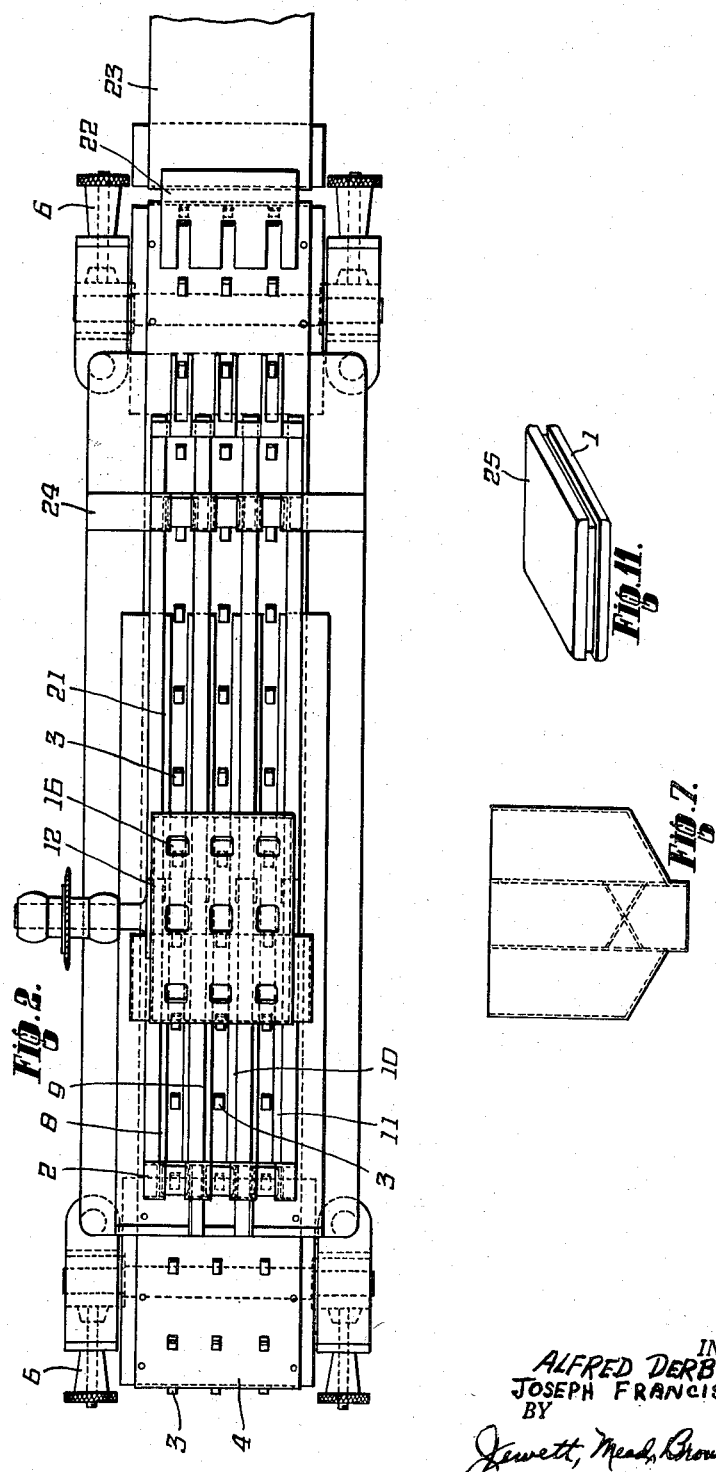

2,657,646

UNITED STATES PATENT OFFICE 2,657,646

APPLICATION OF PLASTIC SUBSTANCES TO BISCUITS AND THE LIKE ARTICLES

Alfred Derbyshire and Joseph Francis Naylor, Newton-le-Willows, England, assignors to T. & T. Vicars Limited, Earlestown, Newton-le-Willows, England, a British company Application April 19, 1951, Serial No. 221,776

3 Claims. (Cl. 107—1)

The present invention relates to an improved apparatus for applying to one surface of a biscuit, cake or the like article of confectionery, a layer of plastic material such as cream, jam, jelly or the like, of the type in which the biscuits are displaced progressively past a stencil moving in synchronism therewith, through the openings of which the cream or the like material is ejected.

The object of the present invention is to provide a machine where the risk of breaking of the biscuit or the like friable article of confectionery is reduced to a minimum, the layer of material is accurately applied to the desired part of its surface, and the risk of the applied material coming upon other parts of the machine is reduced to a minimum.

According to the present invention a biscuit is displaced by dogs on a moving conveyor, by engagement with its rear edge, along laterally spaced inclined ramps adapted to support the biscuit over a minor area alone of its bottom surface to come into rolling contact with a moving stencil surface, through the stencil openings in which a layer of plastic material is applied to its upper surface.

As the biscuit comes into range of the moving stencil, it is preferably supported by individual spring fingers, so that the successive biscuits, which may vary slightly in thickness, can be effectively provided with an applied layer of plastic material on their upper surface without risk of spreading of the said plastic material or of damage to the biscuit by crushing.

The invention is further described with reference to the accompanying drawings, in which:

Fig. 1 is a diagrammatic side elevation of one form of construction,

Fig. 2 is a corresponding plan view,

Fig. 3 is a detail view in sectional elevation of the rotary stencil,

Fig. 4 is a corresponding and sectional view,

Fig. 5 is a detail view of a modified form of conveyor with the driving dogs,

Fig. 6 is a corresponding plan view,

Fig. 7 is a view of one form of hopper for multicolour plastic material,

Fig. 8 is a perspective view of a biscuit having a multi-colour plastic layer applied to it, Fig. 9 is a diagrammatic view of a hopper for a two-colour application, Fig. 10 is an end view of a biscuit having a two-colour applied layer, Fig. 11 is a perspective view of a sandwich biscuit.

Biscuits 1 stacked in a hopper 2 are removed from the base of the pile one at a time by pegs or dogs 3 on a belt 4 which may be displaced step by step from a driving shaft 5, but is preferably continuously driven therefrom, the belt 4 being maintained tensioned by any suitable tensioning devices, such as indicated at 6. The biscuits 1 in hopper 2 are supported by side strips with a space between the strips sufficient to permit the pegs or dogs 3 to pass. The peg or dog is of sufficient height to force the biscuits forward on the base strips, the biscuits when clear of the hopper 2 resting upon ramps 8, 9, 10, 11, which are, at the points mentioned, perfectly horizontal and remain at this height until after the deposit is received. They will then descend along the inlined portion of the ramps 8, 9, 10, 11, to come into range with the second hopper 24. The deposit of plastic material is delivered from a moving stencil element, which may be an endless band but is preferably in the form of a rotating ported cylinder 12 mounted on a hollow shaft 13 and driven from shaft 14 in geared relationship with the main driving shaft 5, so that this stencil drum moves in synchronism with the belt 4. Plastic material can be fed from a hopper (not shown on Figs. 1 and 2 but which may take the form of, for instance, the hopper of Figs. 7 and 9), and emerges from a single conduit formed by the hollow shaft 13 or from opposite ends of this in the case of two colours, or from separate conduits disposed within it in the case of more than two colours, into a delivery funnel 15, the lower edge of which acts as a scraper for the inside of the ported cylinder 12 having the stencil openings 16. Any plastic material which may exude to the outside of the stencil drum or cylinder 12 is removed by a doctor blade 17 and collected in a trough 18.

As the biscuits 1 move along the laterally spaced ramps 8, 9, ... towards the rotary drum or cylinder 12, they come upon spring fingers 19 supporting them resiliently against the surface of the cylinder or drum 12 in rolling contact therewith, a flexible guide 20 serving to assist the accurate positioning of the biscuits as they reach the spring blades 19.

After the biscuits have received their coating of material, the thickness of which will be equivalent to the thickness of wall of the drum or cylinder 12, and the shape and area thereof equivalent to the shape and area of the openings 16, they will move down the reversely inclined portion 21 of the rams 8, 9, ... and may then be conveyed away over a chute 22 to a delivery conveyor 23.

In certain cases it may be desired to manufacture sandwich biscuits, in which case the dogs 3 coming under a second hopper 24 containing a further stack of biscuits 25, will remove one at a time and convey the two super-imposed biscuits with their intermediate layer of plastic material, as shown at the right hand end of Fig. 1.

Instead of a continuous metal belt having driving dogs 3, this may be in the form, as shown in Figs. 5 and 6, of chains 26, certain links of which have driving dogs 27.

We claim:

1. An apparatus for applying a layer of plastic material to laminae, including in combination a movable endless conveyor belt, upstanding dogs mounted on said conveyor belt in spaced longitudinal relationship, pairs of laterally spaced ramps extending longitudinally of and in substantially parallel superposed relationship to said conveyor belt, each pair of said ramps being adapted to support laminae thereon and said dogs being of such height as to abut the edges of laminae when so supported, a movable stencil surface spaced vertically above said ramps to contact laminae supported thereon, means for driving said stencil surface and said conveyor belt imparting to said stencil surface a speed in the direction of movement of said conveyor belt which in the region of contact with laminae supported on said ramps is substantially the same as the linear speed of the conveyor belt, and means to supply plastic material through the stencil openings in said stencil surface.

2. An apparatus for applying a layer of plastic material to laminae, including in combination a movable endless conveyor belt, upstanding dogs mounted on said conveyor belt in spaced longitudinal relationship, pairs of laterally spaced ramps extending longitudinally of and in substantially parallel superposed relationship to said conveyor belt, spring fingers lying parallel to and spaced slightly above each ramp over a portion of their length, each pair of said ramps and respective spring fingers being adapted to support laminae thereon and said dogs being of such height as to abut the edges of laminae when so supported, a movable stencil surface spaced vertically above said spring fingers to contact laminae supported resiliently thereby, means for driving said stencil surface and said conveyor belt imparting to said stencil surface a speed in the direction of movement of said conveyor belt which in the region of contact with laminae supported by said spring fingers is substantially the same as the linear speed of the conveyor belt, and means to supply plastic material through the stencil openings in said stencil surface.

3. An apparatus for applying a layer of plastic material to laminae, including in combination a pair of laterally spaced parallel strips to receive laminae of predetermined size for support thereon by contact of marginal portions of said laminae with said strips, spring fingers lying parallel and spaced slightly above each strip over a portion of their length, said spring fingers being adapted to receive for support therebetween laminae displaced along said strips, a row of spaced upstanding dogs mounted on an endless carrier guided longitudinally below said strips with said dogs between said strips, said dogs being of such height as to project upwardly beyond said spring fingers by an amount less than the thickness of the laminae, a rotary cylindrical stencil surface spaced vertically above and axially transversely of said strips to contact laminae supported resiliently by said spring fingers, means for driving said stencil surface and said endless carrier imparting to said stencil surface a speed substantially equal to the linear speed of said endless carrier and in the same direction where said stencil surface contacts laminae, and means to supply plastic material through the stencil openings in said stencil surface, whereby the laminae are displaced along said strips by engagement of said dogs with the edges thereof to pass on to said spring fingers and into contact with said stencil surface for reception of a coat of plastic material delivered through said stencil openings.

ALFRED DERBYSHIRE.
JOSEPH FRANCIS NAYLOR.

References Cited in the file of this patent

UNITED STATES PATENTS

| Number | Name | Date |
| --- | --- | --- |
| 696,536 | Baker et al. | Apr. 1, 1902 |
| 820,388 | Carter | May 15, 1906 |
| 1,160,532 | Sauy | Nov. 16, 1915 |
| 1,460,825 | Peters et al. | July 3, 1923 |
| 1,585,114 | Rondolin | May 18, 1926 |
| 1,858,175 | Tunstall | May 10, 1932 |
| 1,904,742 | MacFarlane et al. | Apr. 18, 1933 |
| 2,101,240 | Cloud | Dec. 7, 1937 |
| 2,119,909 | Ferry | June 7, 1938 |
| 2,394,795 | Manspeaker | Feb. 12, 1946 |
| 2,424,949 | White | July 29, 1947 |